(12) United States Patent
Kurogi

(10) Patent No.: US 12,025,986 B2
(45) Date of Patent: Jul. 2, 2024

(54) WORKING VEHICLE

(71) Applicant: KUBOTA CORPORATION, Osaka (JP)

(72) Inventor: Toshiaki Kurogi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 402 days.

(21) Appl. No.: 17/352,472

(22) Filed: Jun. 21, 2021

(65) Prior Publication Data

US 2021/0311488 A1 Oct. 7, 2021

Related U.S. Application Data

(63) Continuation of application No. PCT/JP2019/049859, filed on Dec. 19, 2019.

(30) Foreign Application Priority Data

Dec. 26, 2018 (JP) ................................. 2018-243535

(51) Int. Cl.
*G05D 1/02* (2020.01)
*A01B 69/04* (2006.01)
(Continued)

(52) U.S. Cl.
CPC ......... *G05D 1/0223* (2013.01); *A01B 69/006* (2013.01); *A01B 69/008* (2013.01);
(Continued)

(58) Field of Classification Search
None
See application file for complete search history.

(56) References Cited

U.S. PATENT DOCUMENTS

2016/0174453 A1 6/2016 Matsuzaki et al.
2017/0135277 A1 5/2017 Hiramatsu et al.
(Continued)

FOREIGN PATENT DOCUMENTS

EP 3 162 179 A1 5/2017
JP 06-010042 U 2/1994
(Continued)

OTHER PUBLICATIONS

Machine translation of JP 2017199107 A (Year: 2017).*
(Continued)

*Primary Examiner* — Amelia Vorce
*Assistant Examiner* — Kyle S Park
(74) *Attorney, Agent, or Firm* — Keating & Bennett, LLP

(57) ABSTRACT

A working vehicle includes a traveling vehicle connectible to a working device, a position detector to detect a position of the traveling vehicle, an autonomous traveling controller configured or programmed to perform autonomous steering of the traveling vehicle based on a scheduled traveling route and the position of the traveling vehicle detected by the position detector and to control a traveling speed of the traveling vehicle corresponding to the scheduled traveling route, and a distance detector to detect a detected distance between the working device and a worker who works behind the working device. The autonomous traveling controller is configured or programmed to change the traveling speed based on the detected distance.

16 Claims, 10 Drawing Sheets

(51) Int. Cl.
    *A01B 69/08*     (2006.01)
    *G05D 1/00*     (2024.01)
    *A01D 75/18*     (2006.01)

(52) U.S. Cl.
    CPC ......... *G05D 1/0088* (2013.01); *G05D 1/0219* (2013.01); *A01D 75/18* (2013.01)

(56) References Cited

U.S. PATENT DOCUMENTS

| | | | | |
|---|---|---|---|---|
| 2017/0139418 | A1* | 5/2017 | Hiramatsu | ............ A01B 69/008 |
| 2017/0168501 | A1* | 6/2017 | Ogura | .................. G05D 1/0038 |
| 2017/0322550 | A1 | 11/2017 | Yokoyama | |
| 2018/0181143 | A1* | 6/2018 | Hiramatsu | ............ G05D 1/0295 |
| 2019/0227561 | A1* | 7/2019 | Hiramatsu | ............... G05D 1/02 |

FOREIGN PATENT DOCUMENTS

| | | | |
|---|---|---|---|
| JP | 06-242823 | A | 9/1994 |
| JP | 2016-031649 | A | 3/2016 |
| JP | 2016-095659 | A | 5/2016 |
| JP | 2017-199107 | A | 11/2017 |
| WO | 2017/187929 | A1 | 11/2017 |

OTHER PUBLICATIONS

Official Communication issued in International Patent Application No. PCT/JP2019/049859, mailed on Mar. 10, 2020.
Official Communication issued in corresponding European Patent Application No. 19903108.9, mailed on Aug. 26, 2022.

* cited by examiner

| Detected distance x2 | Correction value (%) |
|---|---|
| 0.5m | 0% |
| 1.0m | 120% |
| 2.0m | 110% |
| 3.0m | 100% |
| 4.0m | 80% |
| 5.0m | 60% |
| 6.0m | 0% |

Fig.5

WORKING VEHICLE

CROSS REFERENCE TO RELATED APPLICATIONS

This application is a continuation application of International Application No. PCT/JP2019/049859, filed on Dec. 19, 2019, which claims the benefit of priority to Japanese Patent Application No. 2018-243535, filed on Dec. 26, 2018. The entire contents of each of these applications are hereby incorporated herein by reference.

BACKGROUND OF THE INVENTION

1. Field of the Invention

The present invention relates to a working vehicle such as a tractor capable of autonomously traveling.

2. Description of the Related Art

A working vehicle cooperation system disclosed in Japanese Unexamined Patent Application Publication No. 2016-31649 is known.

The working vehicle cooperation system disclosed in Japanese Unexamined Patent Application Publication No. 2016-31649 is a working vehicle cooperation system configured to perform a ground work using a leading working machine configured to be steered in a manned operation and a follower working vehicle configured to be steered in an unmanned operation, including a leader position detector module to detect a position of the leading working machine, a follower position detector module to detect a position of the following working machine, a route calculator to calculate a scheduled traveling route for unmanned traveling of the follower working vehicle based on a work-traveling locus of the leader working vehicle, and a steering controller to perform the unmanned steering of the follower working vehicle based on a position of the follower working vehicle and the scheduled traveling route so that the follower working vehicle follows the leader working vehicle.

SUMMARY OF THE INVENTION

In an aspect of a preferred embodiment of the present invention, a working vehicle includes a traveling vehicle connectible to a working device, a position detector to detect a position of the traveling vehicle, an autonomous traveling controller configured or programmed to perform autonomous steering of the traveling vehicle based on a scheduled traveling route and the position of the traveling vehicle detected by the position detector and to control a traveling speed of the traveling vehicle corresponding to the scheduled traveling route, and a distance detector to detect a detected distance between the working device and a worker who works behind the working device. The autonomous traveling controller is configured or programmed to change the traveling speed based on the detected distance.

In another aspect of a preferred embodiment of the present invention, a working vehicle includes a traveling vehicle connectible to a working device, a position detector to detect a position of the traveling vehicle, an autonomous traveling controller configured or programmed to perform autonomous steering of the traveling vehicle based on a scheduled traveling route and the position of the traveling vehicle detected by the position detector and to control a traveling speed of the traveling vehicle corresponding to the scheduled traveling route, and a distance detector to detect a detected distance between the working device and a working machine which is operated behind the working device. The autonomous traveling controller is configured or programmed to change the traveling speed based on the detected distance.

The autonomous traveling controller is configured or programmed to change the traveling speed to zero or to be increased when the detected distance is a minimum of a predetermined range or less, does not change the traveling speed when the detected distance is in the predetermined range, and is configured or programmed to change the traveling speed to be decreased when the detected distance is a maximum of the predetermined range or more.

The autonomous traveling controller is configured or programmed to have a first threshold larger than the predetermined range, and change the traveling speed to zero when the detected distance is larger than the predetermined range and is the first threshold or more.

The autonomous traveling controller is configured or programmed to have a second threshold smaller than the predetermined range, change the traveling speed to zero when the detected distance is smaller than the predetermined range and is the second threshold or less, and change the traveling speed to be increased when the detected distance is the minimum of the predetermined range or less and is larger than the second threshold.

The autonomous traveling controller is configured or programmed to change the traveling speed to zero when the detected distance is the first threshold or more.

The autonomous traveling controller is configured or programmed to change the traveling speed to zero when the detected distance is a second threshold or less, the second threshold being smaller than the first threshold.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 5 is a view explaining a way of calculating the traveling speed based on the detected distance and a correction values according to the first preferred embodiment of the present invention.

DETAILED DESCRIPTION OF THE PREFERRED EMBODIMENTS

Figure 1:
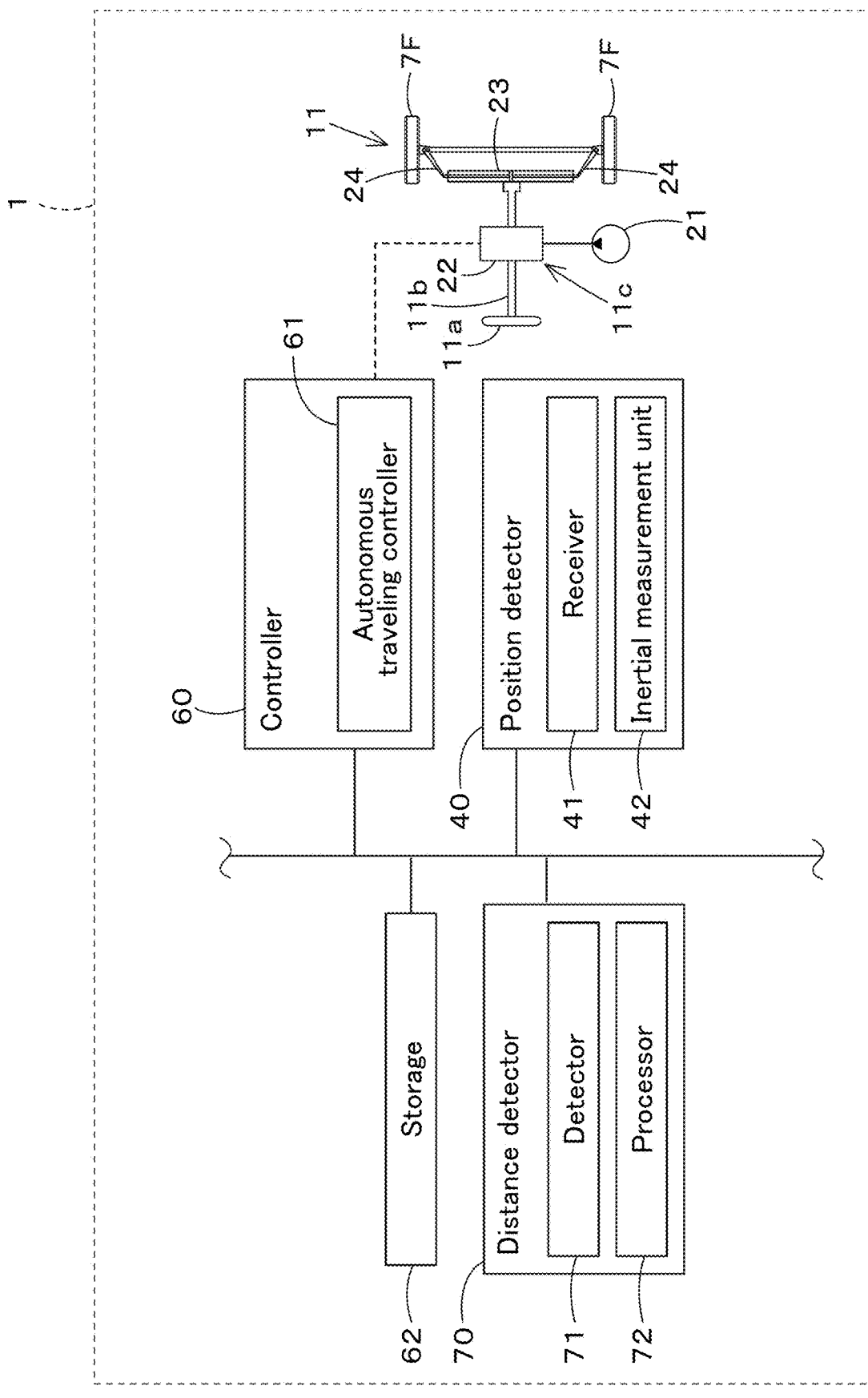
FIG. 1 is a view showing a block diagram of a working vehicle according to a first preferred embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to the drawings, preferred embodiments of the present invention will be described below.

First Preferred Embodiment

Figure 9:
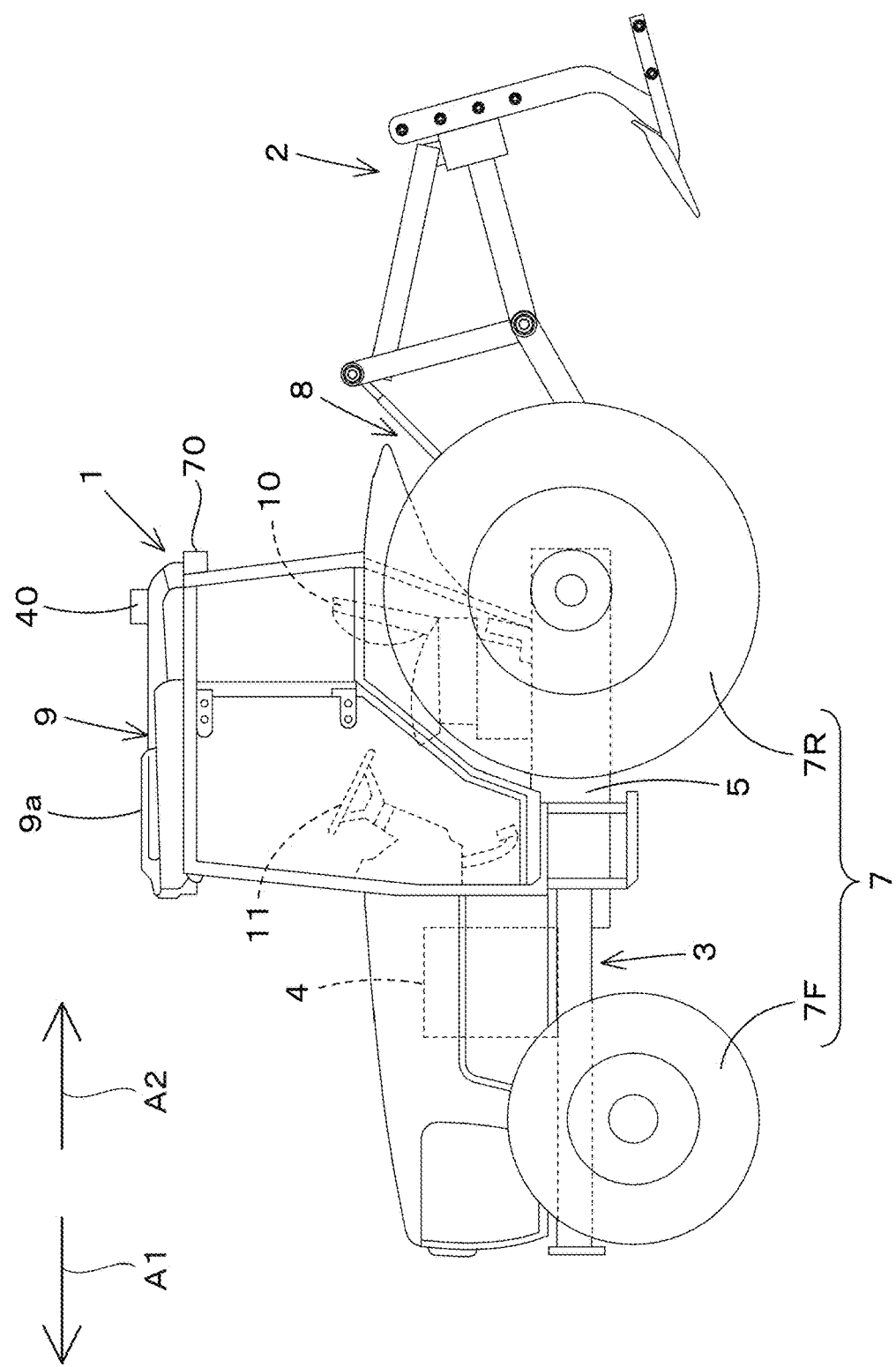
FIG. 9 is a side overall view of the working vehicle.

First, a tractor, one of a working vehicle 1, will be described. As shown in FIG. 9, the tractor 1 includes a traveling vehicle 3 including a traveling device 7, a prime mover 4, and a transmission device 5. The traveling vehicle 3 includes a cabin 9, and a driver seat 10 is located in the cabin 9. In the following description, a forward direction of a driver sitting on the driver seat 10 of the working vehicle 1 (a direction of an arrowed line A1 in FIG. 9) is referred to as the front, a rearward direction of the driver (a direction of an arrowed line A2 in FIG. 9) is referred to as the rear, a leftward direction of the driver (a direction of a front surface side of FIG. 9) is referred to as the left, and a rightward direction of the driver (a direction of a back surface side of FIG. 9) is referred to as the right. In the description, a horizontal direction orthogonal to a fore-and-aft direction of the tractor 1 is referred to as a width direction. The traveling device 7 includes front wheels 7F and rear wheels 7R. The front wheels 7F may be of tire types or crawler types. The rear wheels 7R may also be of the tire types or the crawler types. The prime mover 4 is a diesel engine, an electric motor, or the like. The transmission device 5 is configured to switch a propulsion force of the traveling device 7 by shifting gears, and is configured to switch a traveling direction of the traveling device 7 between forward and backward. The traveling vehicle 3 includes the cabin 9, and the driver seat 10 is located in the cabin 9.

In addition, a connecting portion 8 including a three-point linkage mechanism or the like is located in a rear portion of the traveling vehicle 3. The connecting portion 8 is a lifting device. A working device 2 can be attached to and detached from the lifting device. In this manner, the traveling vehicle 3 can be connected to the working device 2. By connecting the working device 2 to the lifting device, the working device 2 can be towed by the traveling vehicle 3. That is, the working device 2 is connected to a rear portion of the traveling vehicle 3 to perform work. The working device 2 includes a digging device for digging potatoes and carrots, a cultivating device for cultivating, a fertilizer sprayer device for spreading fertilizer, a pesticide sprayer device for spreading pesticides, a harvester device for harvesting, a mower device for mowing grass, a tedder device for tedding grass, a raking device for raking grass, a baler device for baling grass, or the like. FIG. 9 shows an example of a digging device attached to the traveling vehicle 3 as the working device 2.

As shown in FIG. 1, the tractor 1 includes a steering device 11. The steering device 11 includes a steering handle (that is, a steering wheel) 11a, a rotating shaft (that is, a steering shaft) 11b that rotates with the rotating steering wheel 11a, and an assist mechanism (that is, a power steering mechanism) 11c that assists the steering of the steering wheel 11a. The assist mechanism 11c includes a hydraulic pump 21, a control valve 22 to which hydraulic fluid output from the hydraulic pump 21 is supplied, and a steering cylinder 23 to be operated by the control valve 22. The control valve 22 is a solenoid valve to be operated based on a control signal. For example, the control valve 22 is a three-position switching valve configured to be switched by movement of a spool or the like. The control valve 22 can be switched by steering of the steering shaft 11b. The steering cylinder 23 is connected to an arm (that is, a knuckle arm) 24 configured to change orientations of the front wheels 7F.

Thus, when the steering handle 11a is operated, the switching position and opening aperture of the control valve 22 are switched according to operation of the steering handle 11a, and the steering cylinder 23 is stretched and contracted rightward and leftward according to the switching position and opening aperture of the control valve 22 to change steering orientations of the front wheels 7F. The steering device 11 described above is just an example and is not limited to the configuration described above.

Figure 2:
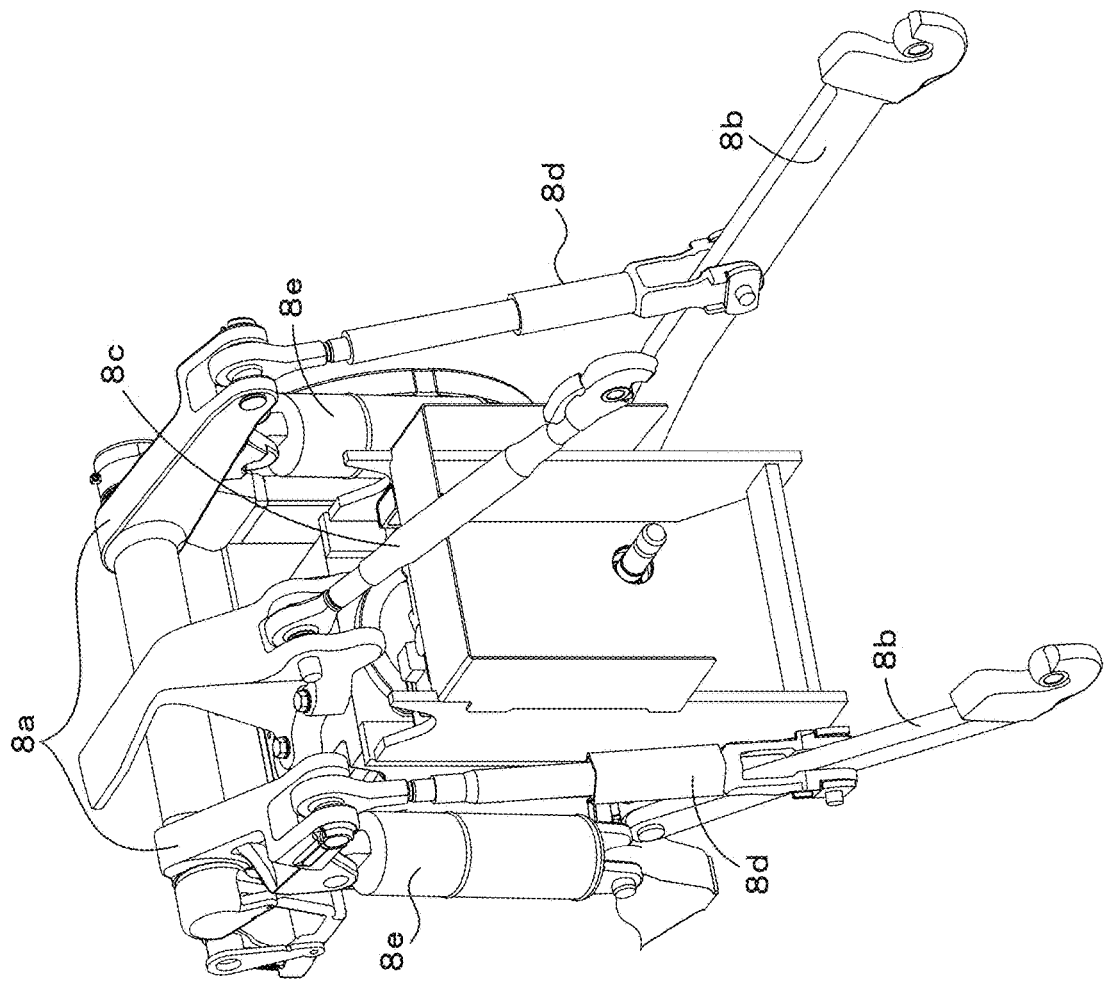
FIG. 2 is a view showing a lifting device according to the first preferred embodiment of the present invention.

As shown in FIG. 2, the lifting device includes lift arms 8a, lower links 8b, a top link 8c, lift rods 8d, and lift cylinders 8e. Front ends of the lift arms 8a are supported swingably upward or downward on a rear upper portion of a case (that is, a transmission case) that houses the transmission device 5. The lift arm 8a is swung (lifted and lowered) by driving of the lift cylinders 8e. The lift cylinders 8e may be hydraulic cylinders. The lift cylinders 8e are connected to the hydraulic pump 21 via the control valve 22. The control valve 22 is a solenoid valve or the like, and stretches and contracts the lift cylinders 8e.

Front ends of the lower links 8b are supported swingably upward and downward on a rear lower portion of the transmission device 5. A front end of the top link 8c is supported on the rear portion of the transmission device 5 above the lower links 8b and swingable upward and downward. The lift rods 8d connect the lift arms 8a to the lower links 8b. The working device 2 is connected to rear portions of the lower links 8b and the top link 8c. When the lift cylinders 8e are driven (stretched and contracted), the lift arms 8a are lifted and lowered, and the lower links 8b connected to the lift arms 8a via the lift rods 8d are lifted and lowered. In this manner, the working device 2 is swung upward or downward (that is, lifted and lowered) with the front portions of the lower links 8b as fulcrums.

As shown in FIGS. 1 and 9, the tractor 1 includes a position detector 40. The position detector 40 detects a position of the traveling vehicle 3. In the present preferred embodiment, the position detector 40 is, for example, a positioning device 40. The positioning device 40 is configured to detect its own position (that is, positioning information including latitude and longitude) through a satellite positioning system (that is, positioning satellites) such as D-GPS, GPS, GLONASS, HOKUTO, GALILEO, or MICHIBIKI. That is, the positioning device 40 receives satellite signals (that is, positions of positioning satellites, transmission times, correction information, and the like)

transmitted from the positioning satellites, and detects a position of the tractor 1 (for example, latitude and longitude), that is, a vehicle position W1, based on the satellite signals. As shown in FIG. 1, the positioning device 40 includes a receiver 41 and an inertial measurement unit (IMU) 42. The receiver 41 includes an antenna to receive satellite signals transmitted from positioning satellites, and is attached to the traveling vehicle 3 separately from the inertial measurement unit 42. In the present preferred embodiment, the receiver 41 is attached to an upper portion of the cabin 9 (that is, a roof 9a) mounted on the traveling vehicle 3. The attachment location of the receiver 41 is not limited to that of the present preferred embodiment.

The inertial measurement unit 42 includes an acceleration sensor to detect acceleration, a gyro sensor to detect an angular velocity, and the like. The inertial measurement unit 42 is located on the traveling vehicle 3, for example, below the driver seat 10, and capable of detecting a roll angle, a pitch angle, a yaw angle, and the like of the traveling vehicle 3.

In the present preferred embodiment, the position detector 40 is the positioning device 40 configured to detect a position of the traveling vehicle 3 based on satellite signals, but it is sufficient for the position detector 40 to be capable of detecting a position of the traveling vehicle 3. Thus, the position detector 40 may be configured to detect a position of the traveling vehicle 3 based on the acceleration detected by the inertial measurement unit 42 and predetermined positional information, and is not limited to the above-mentioned configuration.

As shown in FIG. 1, the tractor 1 includes a controller 60 and a storage 62. The controller 60 is configured or programmed to control a traveling system, a working system, and the like in the tractor 1. The storage 62 is a non-volatile memory or the like, and stores various information relating to the controls of the controller 60.

Figure 3A:
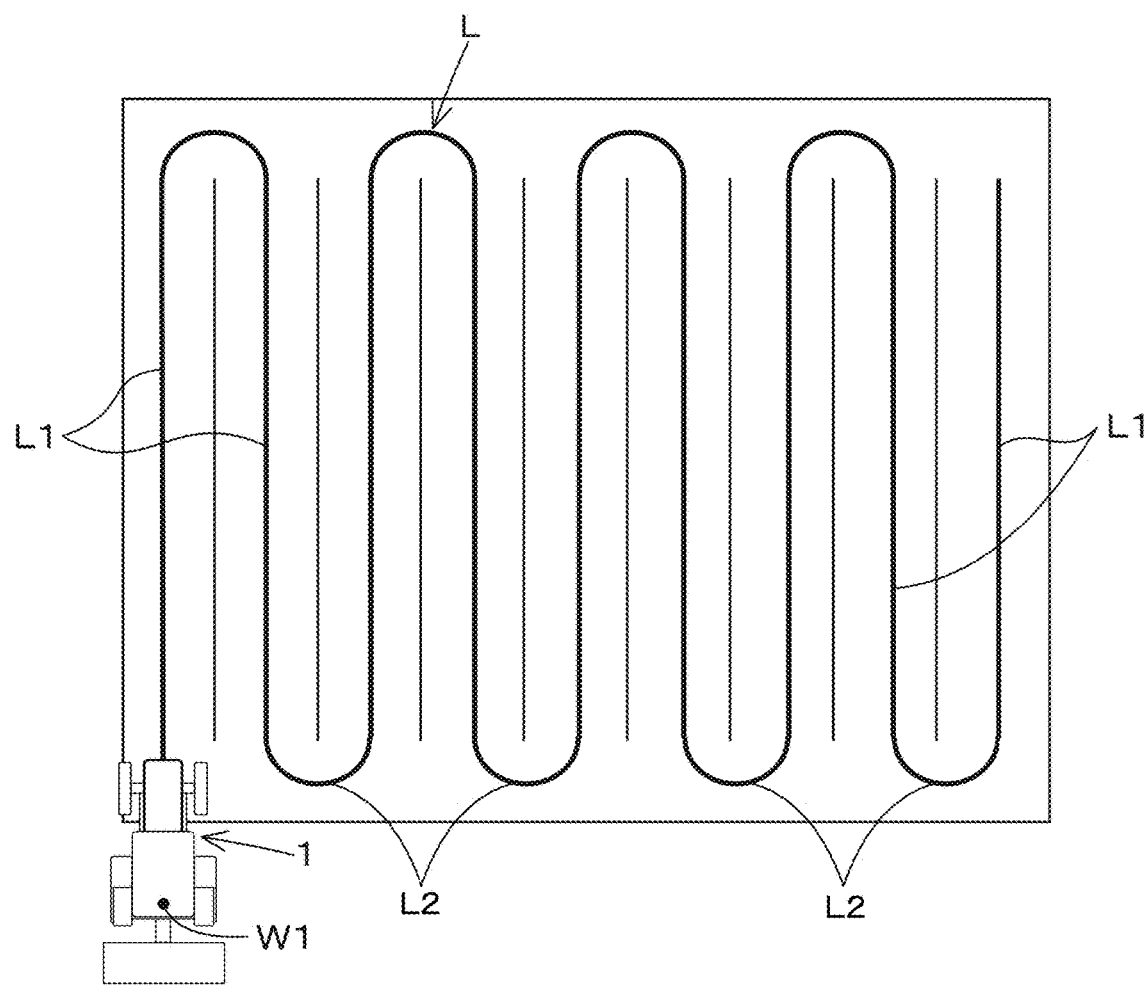
FIG. 3A is a first view explaining autonomous traveling according to the first preferred embodiment of the present invention.

As shown in FIG. 1, the controller 60 is configured or programmed to include an autonomous traveling controller 61 configured or programmed to control autonomous traveling of the tractor 1. The autonomous traveling controller 61 includes electrical/electronic circuits installed in the controller 60, computer programs stored in a CPU, or the like. When starting autonomous traveling, the autonomous traveling controller 61 controls the control valve 22 of the steering device 11 so that the traveling vehicle 3 travels on a scheduled traveling route L. In addition, when starting autonomous traveling, the autonomous traveling controller 61 controls a vehicle speed (that is, a traveling speed) of the tractor 1 by autonomously changing a gear shift of the transmission device 5, a revolving speed of the prime mover 4, and the like. FIG. 3A shows an example of the scheduled traveling route L of the tractor. The scheduled traveling route L includes a straight traveling section L1 in which the tractor 1 travels straight and a turn section L2 in which the tractor 1 turns. When starting autonomous traveling, the autonomous traveling controller 61 controls different traveling speeds respectively in the straight traveling section L1 and in the turn section L2. For example, in the straight traveling section L1, the autonomous traveling controller 61 sets a traveling speed to a speed α. On the other hand, in the turn section L2, the autonomous traveling controller 61 sets a traveling speed to a speed β (β>α), which is slower than the speed α. Note that the autonomous traveling controller 61 may divide the straight traveling section L1 into a plurality of sections and set different traveling speeds respectively for each of the sections. Thus, a control method for the traveling speed is not limited to the above-mentioned configuration.

Figure 3B:
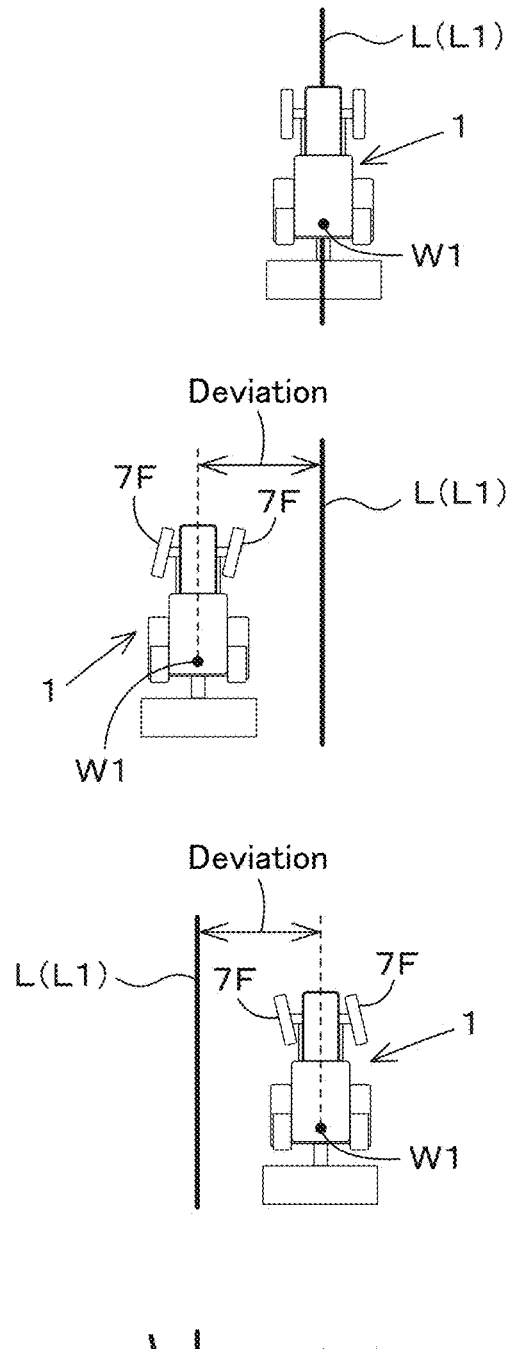
FIG. 3B is a second view explaining the autonomous traveling according to the first preferred embodiment of the present invention.

As shown in FIG. 3B, when a deviation between the vehicle position W1 and the scheduled traveling route L is less than a threshold value in a state where the tractor 1 is autonomously traveling, the autonomous traveling controller 61 maintains a rotation angle of the steering shaft (that is, a rotation shaft) 11b. When a deviation between the vehicle position W1 and the scheduled travel route L is the threshold value or more and the tractor 1 is positioning leftward relative to the scheduled travel route L, the autonomous traveling controller 61 rotates the steering shaft 11b so that a steering direction of the tractor 1 is orientated rightward. When a deviation between the vehicle position W1 and the scheduled traveling route L is the threshold value or more and the tractor 1 is positioning rightward relative to the scheduled traveling route L, the autonomous traveling controller 61 rotates the steering shaft 11b so that a steering direction of the tractor 1 is orientated leftward. In the above-mentioned preferred embodiment, the steering angle of the steering device 11 is changed based on the deviation between the vehicle position W1 and the scheduled traveling route L. However, when an orientation of the scheduled traveling route L is different from an orientation (that is, a vehicle orientation) F1 of a advancing direction (that is, a traveling direction) of the tractor 1 (that is, the traveling vehicle 3), that is, when an angle θg of the vehicle orientation F1 relative to the scheduled traveling route L is a threshold value or more, the autonomous traveling controller 61 may determine a steering angle so that the angle θg can be zero (that is, the vehicle orientation F1 matches an orientation of the scheduled traveling route L). In addition, the autonomous traveling controller 61 may determine the final steering angle in autonomous steering based on a steering angle obtained based on the deviation (that is, a positional deviation) and the steering angle obtained based on the orientation (that is, an orientational deviation). The setting of the steering angle in autonomous steering according to the present preferred embodiment is just an example and is not limited thereto.

As described above, the tractor 1 (that is, the traveling vehicle 3) is capable of autonomously traveling in accordance with the controller 60.

Figure 4:
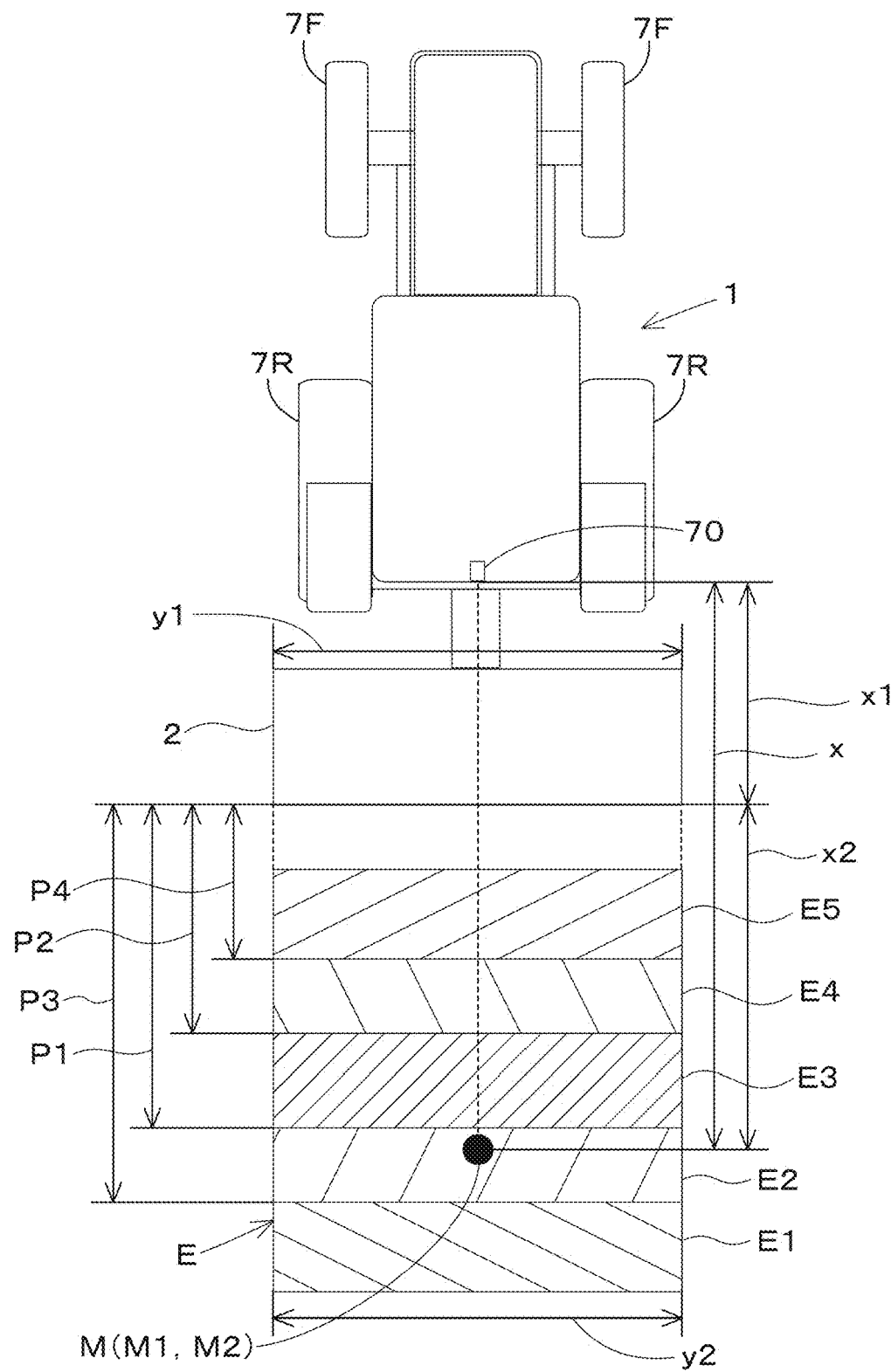
FIG. 4 is a view explaining a way of changing a traveling speed based on a detected direction according to the first preferred embodiment of the present invention.

The tractor 1 is capable of keeping a relative distance within a certain range since the tractor 1 performs autonomous traveling by changing a traveling speed according to the relative distance from an worker M1 and a working machine M2 working behind the working device 2 connected to the tractor 1 during the autonomous traveling. The worker M1 follows and moves with the tractor 1 to assist work performed by the working device 2. When the working device 2 is a digging device as shown in FIG. 9, the worker M1 picks up and harvests crops as an assist work. On the other hand, the working machine M2 performs an assist work for the work performed by the working device 2 while following and moving with the tractor 1. When the working device 2 is a digging device as shown in FIG. 9, the working machine M2 performs an assist work such as loading of crops into containers. For convenience of explanation, the worker M1 and the working machine M2 will be described as a working group M in the following description. The autonomous traveling controller 61 controls a traveling speed corresponding to the scheduled traveling route L, and changes the traveling speed based on a relative distance between the working device 2 and the working group M performing work behind the working device 2. The working vehicle 1 includes a distance detector 70. As shown in FIG. 9, the distance detector 70 is located, for example, at a rear portion of the traveling vehicle 3, and detects a relative distance (that is, detected distance x2) between the working device 2 and the working group M. The distance detector 70 is, for example, a laser scanner that detects the working group M behind the working device 2 and detects a distance to the working group M. The laser scanner has a detection angle range of about 270 degrees rearward of the traveling vehicle 3 and can detect the working group M positioning behind the working device 2. As shown in FIG. 4, the laser scanner is capable of detecting the working group M at least in a target area E on a plane. In the present preferred embodiment, the distance detector 70 is a laser scanner. The distance detector 70 is provided to detect the relative distance between the working device 2 and the working group M behind the working device 2, and may be, for example, a radar sensor, a sonar sensor, or the like, or an imaging device configured to capture images behind the working device 2 to detect the relative distance.

The target area E includes at least an area overlapping an area where the working device 2 performs work. Specifically, one side (that is, a left side) of the target area E in the width direction matches one side (that is, a left side) of an area where the working device 2 perform work or is offset toward the one side (the left side) of the area, and the other side (that is, a right side) of the target area E in the width direction matches the other side (that is, a right side) of the area where the working device 2 perform work or is offset toward the other side (the right side) of the area. A length y2 of the target area E in the width direction is the same as or longer than a length y1 of the area where the working device 2 performs work in the width direction (that is, y2≥y1). In the present preferred embodiment, as shown in FIG. 4, the left side of the target area E in the width direction matches the left side of the area where the working device 2 performs work, and the right side of the target area E in the width direction matches the right side of the area where the working device 2 performs work. In addition, the length y2 of the target area E in the width direction is the same as the length y1 of the area where the working device 2 performs work in the width direction (that is, y2=y1). This allows the distance detector 70 to detect the working group M positioning at least in an area overlapping the area where the working device 2 performs work.

As shown in FIG. 1, the distance detector 70 includes a detector 71 to detect the working group M and a processor 72 to process detection information output from the detector 71. The detector 71 detects the working group M that is closest to the detector 71 among the working groups M located in the target area E. The detector 71 causes a laser beam to be irradiated to the target area E and receives the reflected light of the laser beam reflected on the target area E. The processor 72 detects a detected distance x2 between the working device 2 and the working group M based on time from the start of irradiation by the detector 71 to the receipt of the reflected light. Specifically, the processor 72 detects a relative distance x between the traveling vehicle 3 and the working group M based on the time from the start of irradiation by the detector 71 to the receipt of the reflected light, and subtracts the relative distance x1 between the traveling vehicle 3 and the working device 2 to detect the detected distance x2 (that is, x2=x−x1). The relative distance x1 is a value preliminarily determined corresponding to the working device 2 and stored in the processor 72. The relative distance x1 may be set and changed by a worker (that is, an operator) who operates a mobile terminal such as a personal computer (PC), a smart phone (multi-functional cell phone), a tablet or the like communicatively connected to the tractor 1 or operates a display device provided in the tractor 1, and, the relative distance x1 may be automatically set and changed in response to the working device 2 connected to the connecting portion 8. The processor 72 outputs the processed detected distance x2 to the autonomous traveling controller 61.

As shown in FIG. 9, the distance detector 70 is attached to a rear upper portion of the cabin 9. Specifically, the detector 71 is located on a lower portion of the roof 9a of the cabin 9 and directed rearward and downward. The distance detector 70 is located in a center portion of the lower portion of the roof 9a in the width direction. In the present preferred embodiment, the distance detector 70 is attached to the rear upper portion of the cabin 9. However, it is sufficient for the distance detector 70 to be capable of detecting the detecting distance x2 between the working device 2 and the working group M. Accordingly, the distance detector 70 may be attached to a pillar of the cabin 9 or to the working device 2.

The autonomous traveling controller 61 automatically changes gear shifts of the transmission device 5, a revolving speed of the prime mover 4, and the like based on the detected distance x2, and changes a vehicle speed (that is, a traveling speed) of the tractor 1 (that is, the traveling vehicle 3). Specifically, the autonomous traveling controller 61 automatically changes gear shifts of the transmission device 5, a revolving speed of the prime mover 4, and the like, according to a plurality of areas into which the target area E is divided based on distances from the working device 2, and changes a traveling speed of the traveling vehicle 3. The plurality of areas includes a first area (referred to as a stopping area) E1, a second area (referred to as a deceleration area) E2, a third area (referred to as a speed-keeping area) E3, a fourth area (referred to as an acceleration area) E4, and a fifth area (referred to as a stopping area) E5. As shown in FIG. 4, the target area E is divided into the first area E1, the second area E2, the third area E3, the fourth area E4, and the fifth area E5, in order from the area farthest from the working device 2. The first area E1, the second area E2, the third area E3, the fourth area E4, and the fifth area E5 are divided based on a predetermined range or threshold.

The range and threshold are respectively a range or threshold corresponding to the detected distance x2, and are stored in advance, for example, in a storage 62 arranged in the traveling vehicle 3. The storage 62 stores, for example, a predetermined range, a first threshold P3, and a second threshold P4 as the predetermined range or threshold. The predetermined range is a range defined by an upper limit P1 and a lower limit P2. The first threshold P3 is a value larger than the upper limit P1, and the second threshold P4 is a value smaller than the first threshold P3. In detail, the second threshold P4 is a value smaller than the first threshold P3 and smaller than the lower limit P2.

As shown in FIG. 4, the first area E1 is an area where the detected distance x2 is the first threshold P3 or more (that is, x2≥P3). The second area E2 is an area where the detected distance x2 is less than the first threshold P3 and is the upper limit P1 or more (that is, P3>x≥P1). The second area E2 is an area sandwiched between the first threshold P3 and the upper limit P1 (that is, a predetermined range). The third area E3 is an area where the detected distance x2 is less than the upper limit P1 and is larger than the lower limit P2 (that is, P1>x>P2). The third area E3 is sandwiched between the upper limit P1 and the lower limit P2, and is an area matches the predetermined range. The fourth area E4 is an area where the detected distance x2 is the lower limit P2 or less and is larger than the second threshold P4 (that is, P2≥x>P4). The fourth area E4 is an area sandwiched between the lower limit P2 and the second threshold P4 (that is, the predetermined range). The fifth area E5 is an area where the detected distance x2 is the second threshold P4 or less (that is, x≤P4). The autonomous traveling controller 61 obtains the predetermined range, the first threshold P3, and the second threshold P4 from the storage 62, and changes a traveling speed based on the predetermined range, the first threshold P3, and the second threshold P4, and the detected distance x2 output from the distance detector 70.

The predetermined range (that is, the upper limit P1 and lower limit P2), the first threshold P3, and the second threshold P4 are predetermined values determined in advance and are stored in the storage 62, and the autonomous traveling controller 61 has them by acquiring them from the storage 62; however, the autonomous traveling controller 61 may have in advance the predetermined range, the first threshold P3, and the second threshold P4, and a source of acquisition thereof is not limited to the above-mentioned configuration. The predetermined range, the first threshold P3, and the second threshold P4 may be arbitrarily changeable. The values of the predetermined range, the first threshold P3, and the second threshold P4 can be changed by operating a mobile terminal such as a personal computer (PC), a smart phone (multi-function cell phone), a tablet or other computer communicatively connected to the tractor 1, or the display device provided in the tractor 1. In the present preferred embodiment, the autonomous traveling controller 61 changes a traveling speed according to the plurality of areas into which the target area E is divided based on distances from the working device 2 however, it is sufficient for the autonomous traveling controller 61 to be capable of changing a traveling speed according to a distance from the working device 2. Also, shapes of the plurality of areas are not limited to substantially-rectangular shapes as shown in FIG. 4, may be substantially-fan shapes or substantially-trapezoidal shape, and are not limited to the above-mentioned configuration.

Control performed by the autonomous traveling controller 61 will be described below. The autonomous traveling controller 61 changes a traveling speed to zero or to be increased when the detected distance x2 is the minimum of the predetermined range or less, does not change the traveling speed when the detected distance x2 is within the predetermined range, and changes the traveling speed to be decreased when the detected distance x2 is the maximum of the predetermined range or more. In detail, the autonomous traveling controller 61 changes the traveling speed to zero when the detected distance x2 is larger than the predetermined range and is the first threshold P3 or more. In addition, the autonomous traveling controller 61 changes the traveling speed to zero when the detected distance x2 is smaller than the predetermined range and is the second threshold P4 or less, and changes the traveling speed to be increased when the detected distance x2 is the minimum of the predetermined range or less and is larger than the second threshold P4.

To explain the control performed by the autonomous traveling controller 61 in more detail, when the working group M closest to the detector 71 is positioning in the first area E1 (that is, x≥P3), the autonomous traveling controller 61 changes the traveling speed to zero. The autonomous traveling controller 61 stops the traveling vehicle 3 by controlling the transmission device 5 and a braking device for braking the front wheels 7F or rear wheels 7R. This allows the traveling vehicle 3 to stop traveling when the relative distance between the working device 2 and the working group M becomes relatively large. In this manner, when the working group M is not moving, such as when the working group M is suspending work, the working vehicle 1 can be restrained from proceeding with work ahead irrespective of the working group M without a stopping operation or the like on the traveling vehicle 3.

When the working group M closest to the detector 71 is positioning in the second area E2 (that is, P3>x≥P1), the autonomous traveling controller 61 changes a traveling speed to be reduced from a traveling speed corresponding to the scheduled traveling route L. The autonomous traveling controller 61 decelerates the traveling speed in inverse proportion to a length of the detected distance x2 by shifting down gear shifts of the transmission device 5, reducing a revolving speed of the prime mover 4, braking the front wheels 7F or rear wheels 7R by the braking device, and the like. Specifically, for example, as shown in FIG. 5, the autonomous traveling controller 61 calculates a traveling speed after the changing by multiplying the traveling speed corresponding to the scheduled traveling route L by a correction value determined based on a length of the detected distance x2 (that is, traveling speed after the changing=traveling speed corresponding to the scheduled traveling route L×correction value). In this manner, the autonomous traveling controller 61 changes the traveling speed to be decelerated when the relative distance from the working group M is relatively large in autonomous traveling. Accordingly, it is possible to keep a predetermined relative distance between the working group M and the working device 2 without a stopping operation or the like on the traveling vehicle 3, and to prevent work by the working group M from being delayed from work by the working device 2. In the present preferred embodiment, although the autonomous traveling controller 61 decelerates the traveling speed in inverse proportion to a length of the detected distance x2, the autonomous traveling controller 61 only needs to decelerate the traveling speed to be lower than a traveling speed corresponding to the scheduled traveling route L when the detected distance x2 is less than the first threshold P3 and is larger than the upper limit P1, and thus the autonomous traveling controller 61 may be configured to decelerate the traveling speed to be lower by a certain speed than a traveling speed corresponding to the scheduled traveling route L.

When the working group M closest to the detector 71 is positioning in the third area E3 (that is, P1>x>P2), the autonomous traveling controller 61 does not change the traveling speed from the traveling speed corresponding to the scheduled traveling route L. In other words, when the detected distance x2 is within the predetermined range, the autonomous traveling controller 61 does not change the traveling speed from the traveling speed corresponding to the scheduled traveling route L to keep the traveling speed.

When the working group M closest to the detector 71 is positioning in the fourth area E4 (that is, P2≥x>P4), the autonomous traveling controller 61 changes the traveling speed to be increased from the traveling speed corresponding to the scheduled traveling route L. The autonomous traveling controller 61 increases the traveling speed in inverse proportion to a length of the detected distance x2 by shifting up the gear shift of the transmission device 5 or increasing a revolving speed of the prime mover 4. For example, as in the case where the working group M closest to the detector 71 is positioning in the second area E2, as shown in FIG. 5, the autonomous traveling controller 61 calculates the traveling speed after the changing by multiplying the traveling speed corresponding to the scheduled traveling route L by a correction value determined according to a length of the detected distance x2 (that is, traveling speed after the changing=traveling speed corresponding to scheduled traveling route L×correction value). In this manner, the autonomous traveling controller 61 changes the traveling speed to be increased when a relative distance to the working group M becomes small in autonomous traveling. Accordingly, a predetermined relative distance can be kept between the working device 2 and the working group M, and work by the working group M can be prevented from overtaking work by the working device 2. In the present preferred embodiment, although the autonomous traveling controller 61 increases a traveling speed in inverse proportion to a length of the detected distance x2, the autonomous traveling controller 61 only needs to increase the traveling speed to be higher than the traveling speed corresponding to the scheduled traveling route L when the detected distance x2 is the lower limit P2 or less and is larger than the second threshold P4, and thus may increase the traveling speed by a at a predetermined speed.

When the working group M closest to the detector 71 is positioning in the fifth area E5 (that is, x≤P4), the autonomous traveling controller 61 changes the traveling speed to zero. The autonomous traveling controller 61 stops the traveling vehicle 3 by controlling the braking device or the transmission device 5. This allows the traveling vehicle 3 to stop traveling when a relative distance between the working device 2 and the working group M is relatively small. Accordingly, it is possible to prevent the working group M from closely approaching the working vehicle 1 to inhibit autonomous traveling, and is possible to prevent the working group M from contacting the working vehicle 1.

According to the autonomous traveling controller 61 described above, since a traveling speed of the traveling vehicle 3 is changed according to a relative distance between the working device 2 and the working group M, the relative distance can be kept constant, and the working group M can continue to work without having to stop the working vehicle 1 in accordance with work by the working group M following the working vehicle 1. In addition, even when the working vehicle 1 is not stopped, a predetermined relative distance can be kept between the working device 2 and the working group M, and the work efficiency can be improved by reducing frequency of stopping the working vehicle 1.

A flow of autonomous traveling by the autonomous traveling controller 61 will be described below.

Figure 6:
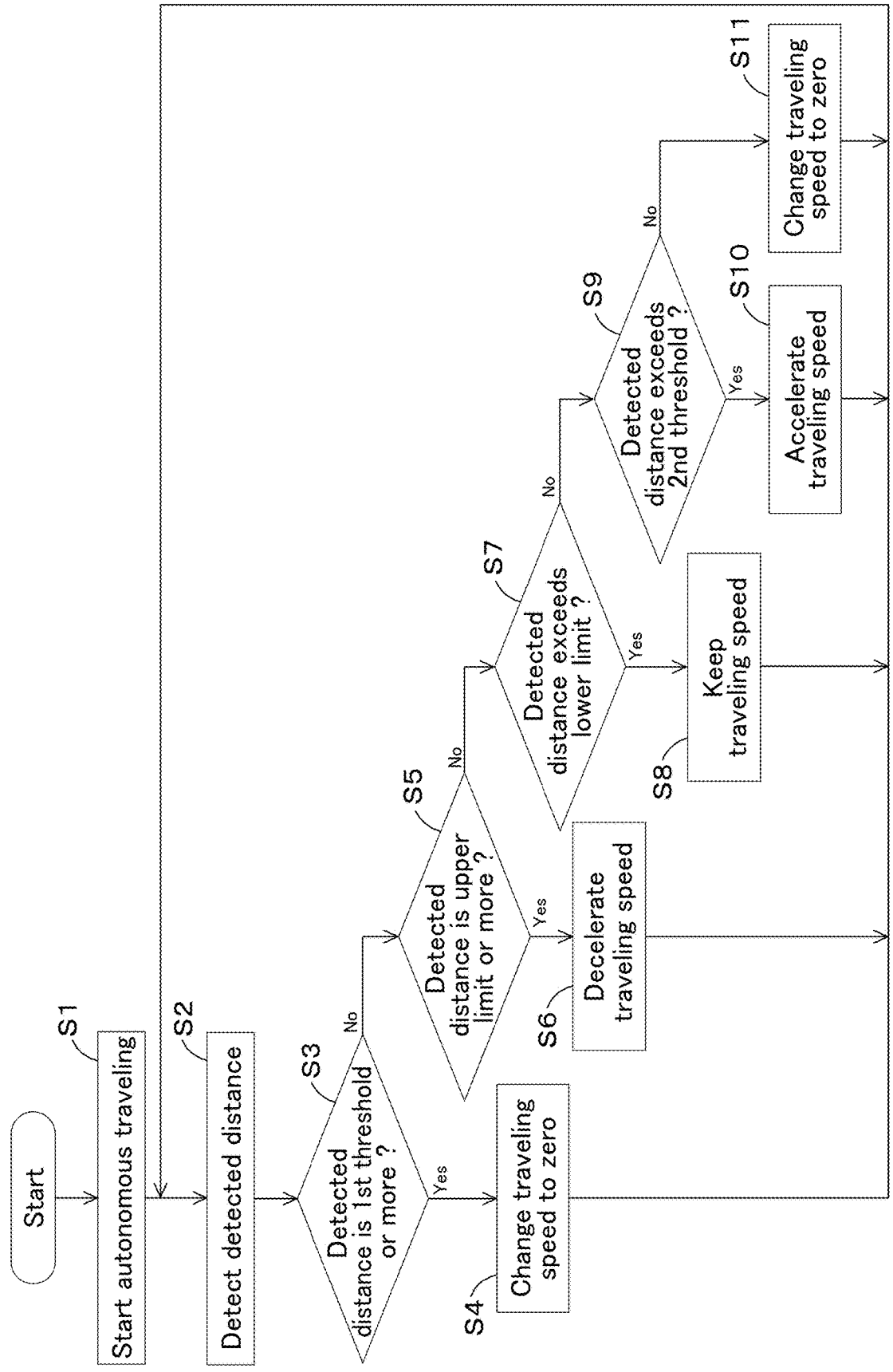
FIG. 6 is a flowchart showing a flow of a controller device according to the first preferred embodiment of the present invention.

As shown in FIG. 6, after the engine 4 of the tractor 1 is started, the autonomous traveling controller 61 starts autonomous traveling of the tractor 1 when the controller 60 acquires a command to start the autonomous traveling of the tractor 1 (step S1). For example, the controller 60 acquires the command to start autonomous traveling from a mobile terminal such as a personal computer (PC), a smart phone (multi-functional cell phone), a tablet, or other computer communicatively connected to the tractor 1. The controller 60 may acquire the start command at a predetermined time to start autonomous traveling, and the source of the start command is not limited to that of the above-mentioned configuration. When starting the autonomous traveling, the autonomous traveling controller 61 controls the control valve 22 of the steering device 11 so that the traveling vehicle 3 travels on the scheduled traveling route L. In addition, when starting the autonomous traveling, the autonomous traveling controller 61 controls a vehicle speed (that is, a traveling speed) of the tractor 1 by autonomously changing gear shifts of the transmission device 5, a revolving speed of the prime mover 4, and the like.

When the autonomous traveling controller 61 starts autonomous traveling of the tractor 1 (step S1), the distance detector 70 detects the detected distance x2 (step S2). Specifically, the detector 71 of the distance detector 70 detects the working group M closest to the detector 71 among the working groups M positioning in the target area E. The detector 71 irradiates a laser beam to the target area E and receives the reflected light of the laser beam reflected on the target area E. The processor 72 of the distance detector 70 detects the detected distance x2 between the working device 2 and the working group M based on time from the start of irradiation by the detector 71 to the receipt of the reflected light. Specifically, the processor 72 detects the relative distance x between the traveling vehicle 3 and the working group M based on the time from the start of irradiation of the detector 71 to the receipt of the light, and subtracts the relative distance x1 between the traveling vehicle 3 and the working device 2 to detect the detected distance x2. The processor 72 outputs the processed detected distance x2 to the autonomous traveling controller 61.

When receiving the detected distance x2 from the distance detector 70, the autonomous traveling controller 61 autonomously changes gear shifts of the transmission device 5 and a revolving speed of the prime mover 4, and the like according to the detected distance x2, and changes a vehicle speed (that is, a traveling speed) of the tractor 1 (step S3 to step S11). Specifically, the autonomous traveling controller 61 first acquires the first threshold P3 from the storage 62, and checks whether the detected distance x2 output from the distance detector 70 is the first threshold P3 or more (step S3). When the detected distance x2 is the first threshold P3 or more (step S3, Yes), the autonomous traveling controller 61 changes the traveling speed to zero (step S4). In other words, when the working group M closest to the detector 71 is positioning in the first area E1, the autonomous traveling controller 61 changes the traveling speed to zero. The autonomous traveling controller 61 stops the traveling vehicle 3 by controlling the transmission device 5 and the braking device for braking the front wheels 7F or the rear wheels 7R.

When the detected distance x2 is less than the first threshold P3 (step S3, No), the autonomous traveling controller 61 acquires the upper limit P1 from the storage 62, and checks whether the detected distance x2 output from the distance detector 70 is the upper limit P1 or more (step S5). When the detected distance x2 is the upper limit P1 or more, the autonomous traveling controller 61 changes the traveling speed to be decelerated from a traveling speed corresponding to the scheduled traveling route L (step S6). The autonomous traveling controller 61 changes the traveling speed to be decelerated when the working group M closest to the detector 71 is positioning in the second area E2, that is, when the detected distance x2 is less than the first threshold P3 and is the maximum of the predetermined range or more. The autonomous traveling controller 61 shifts down gear shifts of the transmission device 5, decreases a revolving speed of the prime mover 4, brakes the front wheels 7F or the rear wheels 7R by the braking device, and the like, to decelerate the traveling speed in inverse proportion to a length of the detected distance x2.

When the detected distance x2 is less than the upper limit P1 (step S5, No), the autonomous traveling controller 61 acquires the lower limit P2 from the storage 62 and checks whether the detected distance x2 output from the distance detector 70 is larger than the lower limit P2 (step S7). When the detected distance x2 is larger than the lower limit P2 (step S7, Yes), the autonomous traveling controller 61 does not change the traveling speed from a traveling speed corresponding to the scheduled traveling route L (step S8). When the working group M closest to the detector 71 is positioning in the third area E3, that is, when the detected distance x2 is within the predetermined range, the autonomous traveling controller 61 does not change the traveling speed from a traveling speed corresponding to the scheduled traveling route L to keep the traveling speed.

When the detected distance x2 is not larger than the lower limit P2 (step S7, No), the autonomous traveling controller 61 acquires the second threshold P4 from the storage 62, and checks whether the detected distance x2 output from the distance detector 70 exceeds the second threshold P4 (step S9). When the detected distance x2 is larger than the second threshold P4 (step S9, Yes), the autonomous traveling controller 61 increases the traveling speed to be higher than a traveling speed corresponding to the scheduled traveling route L (step S10). When the working group M closest to the detector 71 is positioning in the fourth area E4, that is, when the detected distance x2 is less than a predetermined range and is larger than the second threshold P4, the autonomous traveling controller 61 changes the traveling speed to be increased. The autonomous traveling controller 61 shifts up gear shifts of the transmission device 5 and increases a revolving speed of the prime mover 4, and the like to increase the traveling speed in inverse proportion to a length of the detected distance x2.

When the detected distance x2 is not larger than the second threshold P4 (step S9, No), that is, when the detected distance x2 is the second threshold P4 or less, the autonomous traveling controller 61 changes the traveling speed to zero (step S11). In other words, when the working group M closest to the detector 71 is positioning in the fifth area E5, the autonomous traveling controller 61 changes the traveling speed to zero. The autonomous traveling controller 61 stops the traveling vehicle 3 by controlling the braking device and the transmission device 5.

The working vehicle 1 mentioned above includes the traveling vehicle 3 configured to be connected to the working device 2, the position detector 40 to detect a position of the traveling vehicle 3, the autonomous traveling controller 61 to perform autonomous steering of the traveling vehicle 3 based on the scheduled traveling route L and the position of the traveling vehicle 3 detected by the position detector 40 and to control a traveling speed of the traveling vehicle 3 corresponding to the scheduled traveling route L, and the distance detector 70 to detect the detected distance x2 between the working device 2 and the worker M1 who works behind the working device 2. The autonomous traveling controller 61 changes the traveling speed based on the detected distance x2.

According to the above-mentioned configuration, the autonomous traveling controller 61 is capable of changing a traveling speed of the traveling vehicle 3 according to a position of the worker M1 who works behind the working device 2. Thus, a relative distance between the working device 2 and the worker M1 can be kept appropriately, the coordination between the working vehicle 1 and the work by the worker M1 can be easily realized, and the work can be continued without preliminarily lowering a speed of autonomous traveling of the working vehicle 1 or without starting or stopping the working vehicle 1.

In addition, the working vehicle 1 includes the traveling vehicle 3 configured to be connected to the working device 2, the position detector 40 to detect a position of the traveling vehicle 3, the autonomous traveling controller 61 to perform autonomous steering of the traveling vehicle 3 based on the scheduled traveling route L and the position of the traveling vehicle 3 detected by the position detector 40 and to control a traveling speed of the traveling vehicle 3 corresponding to the scheduled traveling route L, and the distance detector 70 to detect the detected distance x2 between the working device 2 and the working machine M2 which is operated behind the working device 2. The autonomous traveling controller 61 changes the traveling speed based on the detected distance x2.

According to the above-mentioned configuration, the autonomous traveling controller 61 is capable of changing a traveling speed of the traveling vehicle 3 according to a position of the working machine M2 who works behind the working device 2. Thus, a relative distance between the working device 2 and the working machine M2 can be kept appropriately, the coordination between the working vehicle 1 and the work by the working machine M2 can be easily realized, and the work can be continued without preliminarily lowering a speed of autonomous traveling of the working vehicle 1 or without starting or stopping the working vehicle 1.

In addition, the autonomous traveling controller 61 changes the traveling speed to zero or to be increased when the detected distance x2 is the minimum of the predetermined range or less, does not change the traveling speed when the detected distance x2 is in the predetermined range, and changes the traveling speed to be decreased when the detected distance x2 is the maximum of the predetermined range or more.

According to the above-mentioned configuration, the autonomous traveling controller 61 increases a traveling speed when a relative distance to the working group M (that is, the worker M1 or the working machine M2) is small in autonomous traveling, and decreases the traveling speed when the relative distance to the working group M is large. Accordingly, a predetermined relative distance can be kept between the working device 2 and the working group M, and work by the working group M can be prevented from delaying behind or overtaking work by the working device 2. In this manner, it is possible to keep a predetermined relative distance between the working device 2 and the working group M without stopping the working vehicle 1, and thus to prevent frequency of stopping the working vehicle 1, thus improving work efficiency.

In addition, the autonomous traveling controller 61 has the first threshold P3 larger than the predetermined range, and changes the traveling speed to zero when the detected distance x2 is larger than the predetermined range and is the first threshold P3 or more.

According to the above-mentioned configuration, when a relative distance between the working device 2 and the working group M becomes relatively large, the working device 2 can stop traveling. Accordingly, during the working group M is not moving, such as during the working group M is suspending work, the working vehicle 1 can be restrained from working ahead of the working group M irrespective of the work by the working group M.

In addition, the autonomous traveling controller 61 has the second threshold P4 smaller than the predetermined range, changes the traveling speed to zero when the detected distance x2 is smaller than the predetermined range and is the second threshold P4 or less, and changes the traveling speed to be increased when the detected distance x2 is the minimum of the predetermined range or less and is larger than the second threshold P4.

According to the above-mentioned configuration, the autonomous traveling controller 61 increases a traveling speed when a relative distance to the working group M is small in autonomous traveling, so that a distance between the working device 2 and the working group M can be kept at a predetermined relative distance, and work by the working group M can be prevented from being delayed with respect to work by the working device 2. On the other hand, when the relative distance between the working device 2 and the working group M becomes smaller, the traveling vehicle 3 can stop traveling. Accordingly, it is possible to prevent the working group M from closely approaching the working vehicle 1 to inhibit autonomous traveling, and is possible to prevent the working group M from contacting the working vehicle 1.

Second Preferred Embodiment

Figure 7:
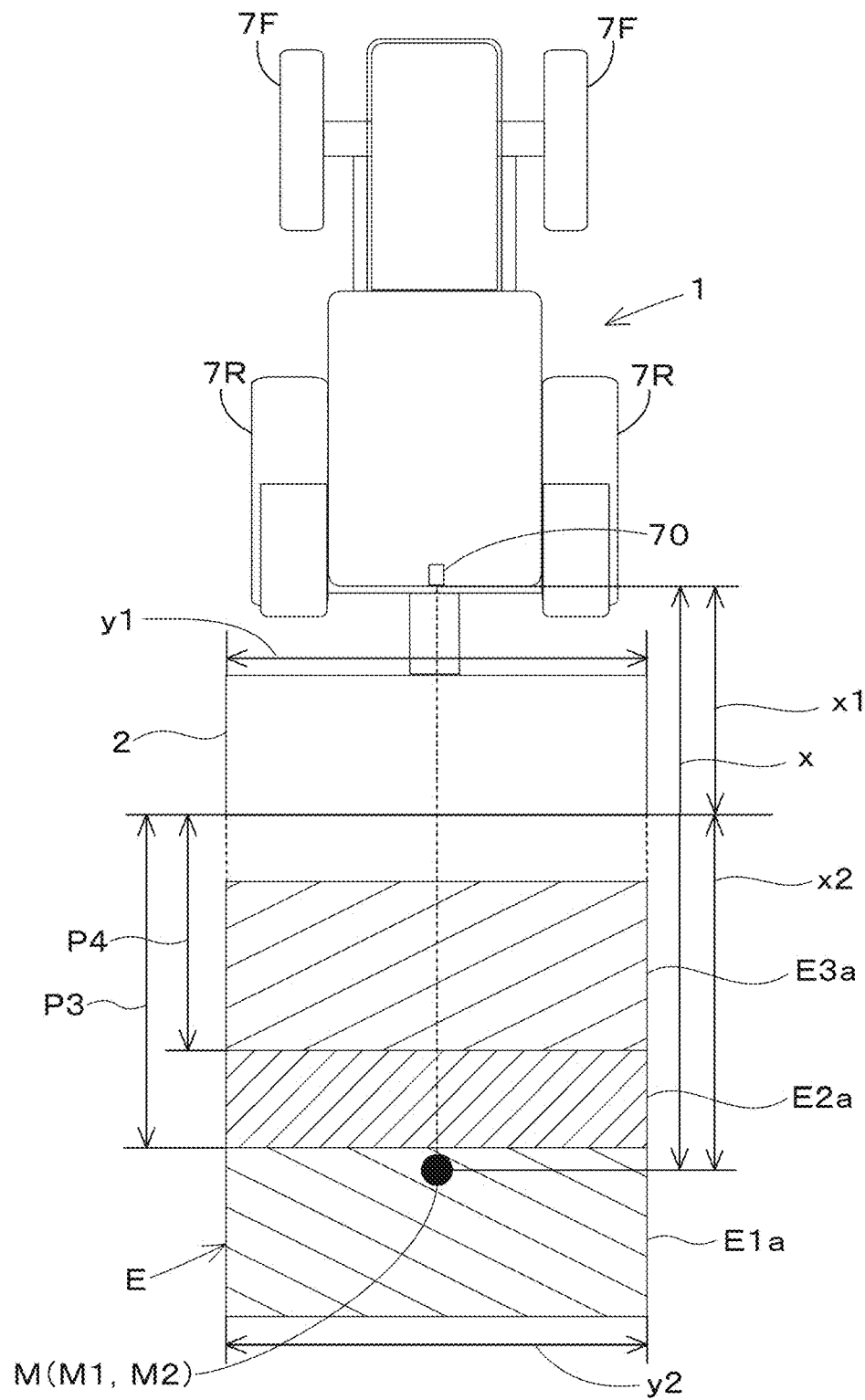
FIG. 7 is a view explaining a way of changing a traveling speed based on a detected direction according to a second preferred embodiment of the present invention.
Figure 8:
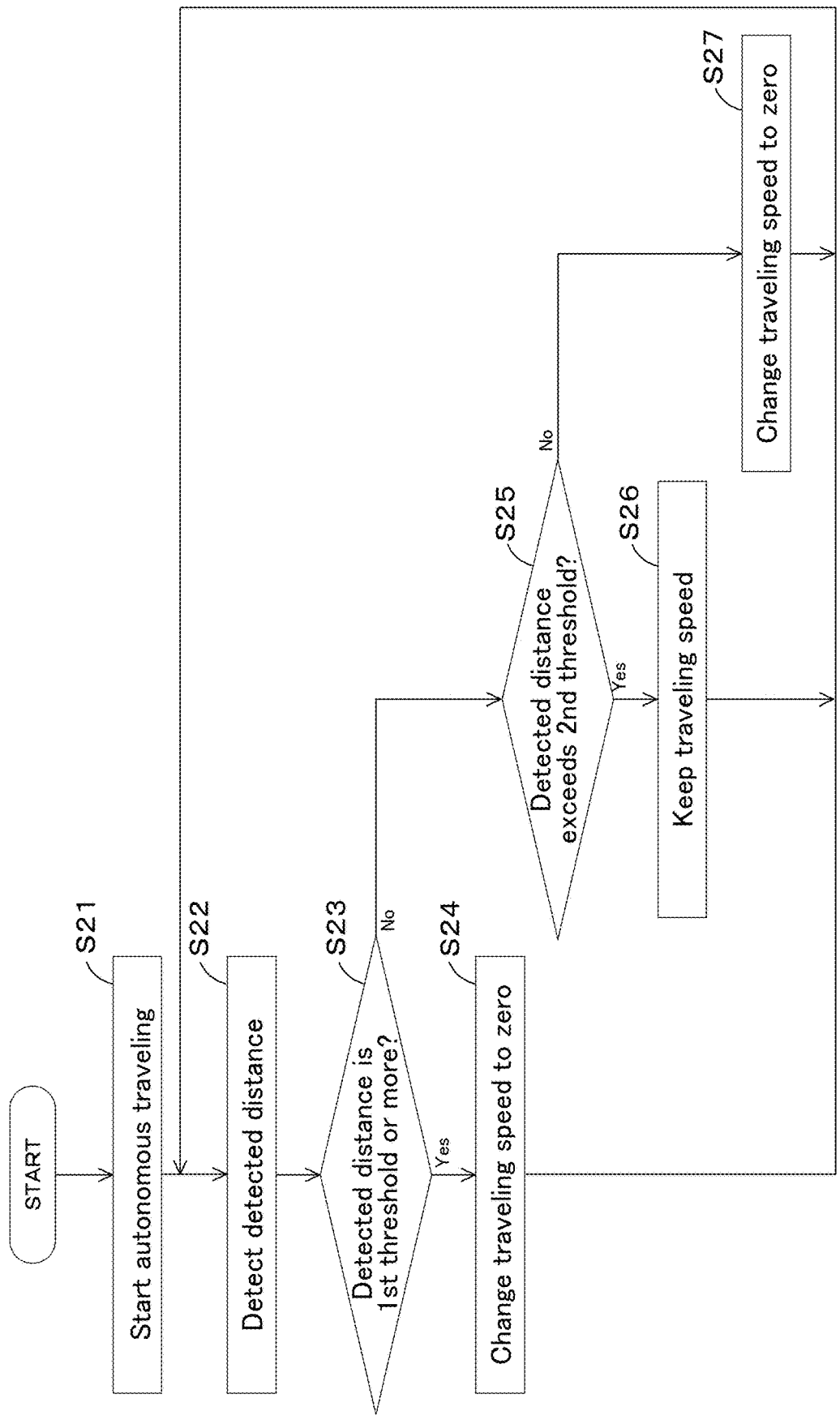
FIG. 8 is a flowchart showing a flow of a controller device according to the second preferred embodiment of the present invention.

FIGS. 7 and 8 show another preferred embodiment (referred to as a second preferred embodiment) of the working vehicle 1.

The following description of the working vehicle 1 according to the second preferred embodiment focuses on configurations that differ from those of the above-mentioned preferred embodiment (that is, the first preferred embodiment), and the same reference numeral or character is given to the configurations shared with the first preferred embodiment to omit detailed description. The working vehicle 1 according to the first preferred embodiment increases and decreases a vehicle speed (that is, a traveling speed) of the tractor 1 by autonomously changing gear shifts of the transmission device 5, a revolving speed of the prime mover 4, and the like in accordance with the detected distance $x2$. However, the working vehicle 1 according to the second preferred embodiment maintains a vehicle speed (that is, a traveling speed) of the tractor 1 or change the vehicle speed to zero by autonomously changing gear shifts of the transmission device 5, a revolving speed of the prime mover 4, and the like in accordance with the detected distance $x2$. The autonomous traveling control according to the second preferred embodiment will be described in detail below.

The autonomous traveling controller 61 maintains a vehicle speed (that is, a traveling speed) of the tractor 1 or changes the vehicle speed to zero according to a plurality of areas into which the target area E is divided based on distances from the working device 2. The plurality of areas include a first area (referred to as a stopping area) E1a, a second area (referred to as a speed-keeping area) E2a, and a third area (referred to as a stopping area) E3a. As shown in FIG. 7, the target area E is divided into the first area E1a, the second area E2a, and the third area E3a in order from the area farthest from the working device 2. As shown in FIG. 7, the first area E1a, the second area E2a, and the third area E3a are divided based on a predetermined range or threshold.

In the second preferred embodiment, the threshold and range are, for example, the first threshold P3 and the second threshold P4. The first threshold P3 and the second threshold P4 are stored in the storage 62. The first threshold P3 is a value preliminarily determined, and the second threshold P4 is a smaller value than the first threshold P3.

As shown in FIG. 7, the first area E1a is an area in which the detected distance $x2$ is the first threshold P3 or more. The second area E2a is an area in which the detected distance $x2$ is less than the first threshold P3 and is larger than the second threshold P4. The second area E2a is an area sandwiched between the first threshold P3 and the second threshold P4. The third area E3a is an area in which the detected distance $x2$ is the second threshold P4 or less. The autonomous traveling controller 61 acquires the first threshold P3 and the second threshold P4 from the storage 62, and maintains a traveling speed or changes the traveling speed to zero based on the first threshold P3, the second threshold P4, and the detected distance $x2$ output from the distance detector 70.

The autonomous traveling controller 61 changes the traveling speed to zero when the detected distance $x2$ is the first threshold P3 or more. The autonomous traveling controller 61 changes the traveling speed to zero when the detected distance $x2$ is the second threshold P4 or less. Control by the autonomous traveling controller 61 will be described in detail below.

When the working group M closest to the detector 71 is positioning in the first area E1a (that is, $x \geq P3$), the autonomous traveling controller 61 changes the traveling speed to zero. The autonomous traveling controller 61 stops the traveling vehicle 3 by controlling the transmission device 5 and the braking device that performs braking of the front wheels 7F or rear wheels 7R. This allows the traveling vehicle 3 to stop traveling when a relative distance between the working device 2 and the working group M becomes relatively large. Accordingly, during the working group M is not moving, such as during the working group M is suspending work, the working vehicle 1 can be restrained from working ahead of the working group M irrespective of the work by the working group M.

When the working group M closest to the detector 71 is positioning in the second area E2a (that is, $P3>x>P4$), the autonomous traveling controller 61 does not change the traveling speed from a traveling speed corresponding to the scheduled traveling route L. That is, when the detected distance $x2$ is less than the first threshold P3 and is larger than the second threshold P4, the autonomous traveling controller 61 does not change the traveling speed from a traveling speed corresponding to the scheduled traveling route L and maintains the traveling speed.

When the working group M closest to the detector 71 is positioning in the third area E3a (that is, $x \leq P4$), the autonomous traveling controller 61 changes the traveling speed to zero. The autonomous traveling controller 61 stops the traveling vehicle 3 by controlling the braking device and the transmission device 5. This allows the traveling vehicle 3 to stop traveling when a relative distance between the working device 2 and the working group M is relatively small. Accordingly, it is possible to prevent the working group M from closely approaching the working vehicle 1 to inhibit autonomous traveling, and is possible to prevent the working group M from contacting the working vehicle 1.

A flow of autonomous traveling by the autonomous traveling controller 61 will be described below.

As shown in FIG. 8, after the engine 4 of the tractor 1 is started, the autonomous traveling controller 61 starts autonomous traveling of the tractor 1 when the controller 60 acquires a command to start autonomous traveling of the tractor 1 (step S21). The controller 60 acquires the command to start autonomous traveling from a mobile terminal such as a personal computer (PC), a smart phone (multi-functional cell phone), a tablet, or other computer communicatively connected to the tractor 1. When starting the autonomous traveling, the autonomous traveling controller 61 controls the control valve 22 of the steering device 11 so that the traveling vehicle 3 travels on the scheduled traveling route L. In addition, when starting the autonomous traveling, the autonomous traveling controller 61 controls a vehicle speed (that is, a traveling speed) of the tractor 1 by autonomously changing gear shifts of the transmission device 5, a revolving speed of the prime mover 4, and the like.

When the autonomous traveling controller 61 starts autonomous traveling of the tractor 1 (step S21), the distance detector 70 detects the detected distance x2 (step S22). The detector 71 of the distance detector 70 detects the working group M closest to the detector 71 among the working groups M positioning in the target area E. The detector 71 irradiates a laser beam to the target area E and receives the reflected light of the laser beam reflected on the target area E. The processor 72 of the distance detector 70 detects the detected distance x2 between the working device 2 and the working group M based on time from start of irradiation by the detector 71 to receipt of the reflected light. Specifically, the processor 72 detects the relative distance x between the traveling vehicle 3 and the working group M based on the time from start of irradiation by the detector 71 to receipt of the reflected light, and subtracts the relative distance x1 between the traveling vehicle 3 and the working device 2 to detect the detected distance x2. The processor 72 outputs the processed detected distance x2 to the autonomous traveling controller 61.

When receiving the detected distance x2 from the distance detector 70, the autonomous traveling controller 61 automatically changes gear shifts of the transmission device 5, a revolving speed of the prime mover 4, and the like based on the detected distance x2, and maintains the traveling speed or changes the traveling speed to zero (step S23 to step S27). Specifically, the autonomous traveling controller 61 first acquires the first threshold P3 from the storage 62, and checks whether the detected distance x2 output from the distance detector 70 is the first threshold P3 or more (step S23). When the detected distance x2 is the first threshold P3 or more (step S23, Yes), the autonomous traveling controller 61 changes the traveling speed to zero (step S24). In other words, when the working group M closest to the detector 71 is positioning in the first area E1a, the autonomous traveling controller 61 changes the traveling speed to zero. The autonomous traveling controller 61 stops the traveling vehicle 3 by controlling the transmission device 5 and the braking device for braking the front wheels 7F or the rear wheels 7R.

When the detected distance x2 is less than the first threshold P3 (step S23, No), the autonomous traveling controller 61 acquires the second threshold P4 from the storage 62, and checks whether the detected distance x2 output from the distance detector 70 is larger than the second threshold P4 (step S25). When the detected distance x2 is larger than the second threshold P4, the autonomous traveling controller 61 does not change the traveling speed from a traveling speed corresponding to the scheduled traveling route L (step S26). When the working group M closest to the detector 71 is positioning in the second area E2a, that is, when the detected distance x2 is less than the first threshold P3 and is larger than the second threshold P4, the autonomous traveling controller 61 does not change the traveling speed from a traveling speed corresponding to the scheduled traveling route L and maintains the traveling speed.

When the detected distance x2 is not larger than the second threshold P4 (step $25, No), that is, when the detected distance x2 is the second threshold P4 or less, the autonomous traveling controller 61 changes the traveling speed to zero (step S27). In other words, when the working group M closest to the detector 71 is positioning in the third area E3a, the autonomous traveling controller 61 changes the traveling speed to zero. The autonomous traveling controller 61 stops the traveling vehicle 3 by controlling the braking device and the transmission device 5.

The autonomous traveling controller 61 described above changes the traveling speed to zero when the detected distance x2 is the first threshold P3 or more.

According to the above-mentioned configuration, the traveling vehicle 3 can stop traveling when a relative distance between the working group M (that is, the worker M1 or the working machine M2) and the working device 2 is large. Accordingly, during the working group M is not moving, such as during the working group M is suspending work, the working vehicle 1 can be restrained from working ahead of the working group M irrespective of the work by the working group M.

In addition, the autonomous traveling controller 61 changes the traveling speed to zero when the detected distance x2 is less than or equal to the second threshold P4, which is smaller than the first threshold P3.

According to the above-mentioned configuration, the traveling vehicle 3 can stop traveling when a relative distance between the working group M and the working device 2 is small. Accordingly, it is possible to prevent the working group M from closely approaching the working vehicle 1 to inhibit autonomous traveling, and is possible to prevent the working group M from contacting the working vehicle 1.

In the above description, the preferred embodiments of the present invention have been explained. However, all the features of the preferred embodiments disclosed in this application should be considered just as examples, and the preferred embodiments do not restrict the present invention accordingly. A scope of the present invention is shown not in the above-described preferred embodiments but in the claims, and is intended to include all modifications within and equivalent to a scope of the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
 a traveling vehicle connectible to a working device;
 a position detector to detect a position of the traveling vehicle;
 an autonomous traveling controller configured or programmed to perform autonomous steering of the traveling vehicle based on a scheduled traveling route and the position of the traveling vehicle detected by the position detector and to control a traveling speed of the traveling vehicle corresponding to the scheduled traveling route; and
 a distance detector to detect an area behind the working device that overlaps an area where the working device performs work and to detect a detected distance between the working device and a worker performing assist work for the work performed by the working device when the worker is behind the working device and following and moving with the traveling vehicle; wherein
 the autonomous traveling controller is configured or programmed to:
 not change the traveling speed when the detected distance is within a predetermined range;
 change the traveling speed to be increased when the detected distance is a minimum of the predetermined range or less and is larger than a second threshold which is smaller than the predetermined range; and change the traveling speed to zero when the detected distance is the second threshold or less.

2. The working vehicle according to claim 1, wherein the autonomous traveling controller is configured or programmed to:
change the traveling speed to be decreased when the detected distance is a maximum of the predetermined range or more.

3. The working vehicle according to claim 2, wherein the autonomous traveling controller is configured or programmed to:
change the traveling speed to zero when the detected distance is larger than a first threshold or more, the first threshold being larger than the predetermined range.

4. The working vehicle according to claim 3, wherein
the distance detector is configured or programmed to detect the worker in a target area on a plane;
one of opposite sides in a width direction of the target area matches one of opposite sides in the width direction of the area where the working device performs the work or is located outward of the one of the opposite sides of the area where the working device performs the work along the width direction; and
the other of the opposite sides of the target area matches the other of the opposite sides of the area where the working device performs the work or is located outward of the other of the opposite sides of the area where the working device performs the work along the width direction.

5. The working vehicle according to claim 4, wherein
the working device is a digging device to dig crops; and
the assist work is picking up the crops, harvesting the crops, and/or loading the crops into a container.

6. The working vehicle according to claim 3, wherein
the working device is a digging device to dig crops; and
the assist work is picking up the crops, harvesting the crops, and/or loading the crops into a container.

7. The working vehicle according to claim 2, wherein
the working device is a digging device to dig crops; and
the assist work is picking up the crops, harvesting the crops, and/or loading the crops into a container.

8. The working vehicle according to claim 1, wherein
the working device is a digging device to dig crops; and
the assist work is picking up the crops, harvesting the crops, and/or loading the crops into a container.

9. A working vehicle comprising:
a traveling vehicle connectible to a working device;
a position detector to detect a position of the traveling vehicle;
an autonomous traveling controller configured or programmed to perform autonomous steering of the traveling vehicle based on a scheduled traveling route and the position of the traveling vehicle detected by the position detector and to control a traveling speed of the traveling vehicle corresponding to the scheduled traveling route; and
a distance detector to detect an area behind the working device that overlaps an area where the working device performs work and to detect a detected distance between the working device and a working machine performing assist work for the work performed by the working device when the working machine is behind the working device and following and moving with the traveling vehicle; wherein
the autonomous traveling controller is configured or programmed to:
not change the traveling speed when the detected distance is within a predetermined range;
change the traveling speed to be increased when the detected distance is a minimum of the predetermined range or less and is larger than a second threshold which is smaller than the predetermined range; and
change the traveling speed to zero when the detected distance is the second threshold or less.

10. The working vehicle according to claim 9, wherein the autonomous traveling controller is configured or programmed to:
change the traveling speed to be decreased when the detected distance is a maximum of the predetermined range or more.

11. The working vehicle according to claim 10, wherein the autonomous traveling controller is configured or programmed to:
change the traveling speed to zero when the detected distance is a first threshold or more, the first threshold being larger than the predetermined range.

12. The working vehicle according to claim 11, wherein
the distance detector is configured or programmed to detect the working machine in a target area on a plane;
one of opposite sides in a width direction of the target area matches one of opposite sides in the width direction of the area where the working device performs the work or is located outward of the one of the opposite sides of the area where the working device performs the work along the width direction; and
the other of the opposite sides of the target area matches the other of the opposite sides of the area where the working device performs the work or is located outward of the other of the opposite sides of the area where the working device performs the work along the width direction.

13. The working vehicle according to claim 12, wherein
the working device is a digging device to dig crops; and
the assist work is picking up the crops, harvesting the crops, and/or loading the crops into a container.

14. The working vehicle according to claim 11, wherein
the working device is a digging device to dig crops; and
the assist work is picking up the crops, harvesting the crops, and/or loading the crops into a container.

15. The working vehicle according to claim 10, wherein
the working device is a digging device to dig crops; and
the assist work is picking up the crops, harvesting the crops, and/or loading the crops into a container.

16. The working vehicle according to claim 9, wherein
the working device is a digging device to dig crops; and
the assist work is picking up the crops, harvesting the crops, and/or loading the crops into a container.

* * * * *